(12) United States Patent
Thukral et al.

(10) Patent No.: US 9,355,102 B2
(45) Date of Patent: May 31, 2016

(54) PERSONALIZED TRANSACTION MANAGEMENT AND MEDIA DELIVERY SYSTEM

(75) Inventors: Rohit Thukral, San Jose, CA (US); Vernon Niven, Los Altos Hills, CA (US)

(73) Assignee: Churchill Downs Technology Initiatives Company, Louisville, KY (US)

( * ) Notice: Subject to any disclaimer, the term of this patent is extended or adjusted under 35 U.S.C. 154(b) by 471 days.

(21) Appl. No.: 12/428,305

(22) Filed: Apr. 22, 2009

(65) Prior Publication Data

US 2009/0270166 A1 Oct. 29, 2009

Related U.S. Application Data

(60) Provisional application No. 61/047,707, filed on Apr. 24, 2008.

(51) Int. Cl.
*G06F 17/00* (2006.01)
*G06F 17/30* (2006.01)
*G07F 17/32* (2006.01)

(52) U.S. Cl.
CPC .... *G06F 17/30038* (2013.01); *G06F 17/30056* (2013.01); *G06F 17/30058* (2013.01); *G07F 17/3288* (2013.01)

(58) Field of Classification Search
CPC .......... G07F 17/3288; G06F 17/30017; G06F 17/30058
USPC .......... 715/201, 202, 203, 205, 719; 725/100, 725/112, 60; 463/42
See application file for complete search history.

(56) References Cited

U.S. PATENT DOCUMENTS 5,548,324 A * 8/1996 Downs et al. ................ 348/14.1
5,745,895 A * 4/1998 Bingham et al.
(Continued)

FOREIGN PATENT DOCUMENTS

WO WO03079220 * 3/2002 .............. G06F 17/21
WO WO 03/079220 A 9/2003

OTHER PUBLICATIONS

PCT International Search Report and Written Opinion, PCT/US2009/041473, Nov. 3, 2009, 10 Pages.
(Continued)

*Primary Examiner* — Scott Baderman
*Assistant Examiner* — Howard Cortes
(74) *Attorney, Agent, or Firm* — Fenwick & West LLP

(57) ABSTRACT

Media data for a live event such as a horse race, associated real-time data, and contextually related asynchronous data are presented to an end user. A content delivery network distributes the media data and a server distributes the associated real-time data. A time synchronization module combines the media data with the associated real-time data based on a correspondence of temporal data and outputs an integrated data feed. A contextual relating module identifies asynchronous data stored by an asynchronous data storage as contextually relevant to the integrated data feed, outputs the contextually relevant asynchronous data, and records the integrated data feed and contextually relevant asynchronous data for playback as an integrated data combination. A client device executes an application for presenting to the end user the data included in the integrated data feed output by the time synchronization module along with contextually relevant asynchronous data output by the contextual relating module.

28 Claims, 9 Drawing Sheets

(56) References Cited

U.S. PATENT DOCUMENTS

| | | | |
|---|---|---|---|
| 5,774,664 A * | 6/1998 | Hidary et al. | 725/110 |
| 5,818,435 A * | 10/1998 | Kozuka et al. | 715/202 |
| 5,842,921 A * | 12/1998 | Mindes et al. | 463/16 |
| 5,983,236 A * | 11/1999 | Yager et al. | |
| 6,006,241 A * | 12/1999 | Purnaveja et al. | 715/205 |
| 6,018,768 A | 1/2000 | Ullman et al. | |
| 6,094,661 A * | 7/2000 | Salomaki | |
| 6,449,653 B2 * | 9/2002 | Klemets et al. | 709/231 |
| 6,674,448 B1 * | 1/2004 | Garahi et al. | 715/719 |
| 6,715,126 B1 * | 3/2004 | Chang et al. | 715/201 |
| 7,478,089 B2 * | 1/2009 | Henkin et al. | |
| 7,739,584 B2 * | 6/2010 | Vella et al. | 715/203 |
| 7,930,624 B2 * | 4/2011 | Phillips et al. | 715/201 |
| 2002/0049975 A1 * | 4/2002 | Thomas et al. | 725/60 |
| 2002/0077712 A1 * | 6/2002 | Safaei et al. | 700/93 |
| 2002/0112247 A1 * | 8/2002 | Horner et al. | 725/112 |
| 2003/0144054 A1 * | 7/2003 | DeWeese et al. | 463/30 |
| 2003/0206182 A1 * | 11/2003 | Kelly et al. | 345/632 |
| 2004/0257472 A1 * | 12/2004 | Mpr et al. | 348/565 |
| 2005/0044575 A1 * | 2/2005 | Der Kuyl | 725/100 |
| 2005/0116410 A1 * | 6/2005 | Vlazny et al. | 273/139 |
| 2008/0009344 A1 * | 1/2008 | Graham et al. | 463/25 |
| 2008/0020814 A1 * | 1/2008 | Kernene | 463/10 |
| 2008/0088735 A1 * | 4/2008 | Biniak et al. | 348/468 |
| 2008/0139316 A1 * | 6/2008 | He et al. | 463/42 |
| 2008/0182651 A1 * | 7/2008 | Marshall et al. | 463/25 |
| 2009/0061974 A1 * | 3/2009 | Lutnick et al. | 463/13 |

OTHER PUBLICATIONS

Communication Pursuant to Article 94(3) for European Patent Application No. EP 09735691.9, Dec. 7, 2012, 7 Pages.

* cited by examiner

PERSONALIZED TRANSACTION MANAGEMENT AND MEDIA DELIVERY SYSTEM

CROSS REFERENCE TO RELATED APPLICATIONS

This application claims the benefit of U.S. Provisional Application No. 61/047,707, filed Apr. 24, 2008, which is incorporated by reference in its entirety.

BACKGROUND

1. Field of Art

The enclosed embodiments generally relate to systems for remote interactions. More particularly, they relate to a system and method for providing high quality media integrated with transaction data.

2. Description of the Related Art

The popularity of wagering has increased immensely in recent years. Wagering as a whole is a multi-billion dollar industry, with millions of people flocking to physical destinations to place wagers each year. However, not everyone can conveniently reach such destinations every time that they wish to wager. This has spawned a proliferation of remote wagering services such as online gaming websites. These websites cater to a wide variety of wagering activities, including, among others, horse racing, poker and sports wagering. One longstanding form of remote wagering has been Off-Track Betting (OTB) for horse racing. Recently, OTB services have evolved to include both Internet and television based services in an effort to satisfy customer demands. However, these new implementations of off-track betting services fail to provide users with an experience that satisfactorily recreates the on-track experience. Existing solutions provide a user with a website containing a wagering interface. However, due to a lack of supporting technologies, the wagering interface is separate from the display used to view the particular horse race wagered upon.

SUMMARY

A system and method disclosed includes integrating media data (e.g., video and audio of a horse race, other sporting event, live concert, or game show), transactional data (e.g., data related to wagering on the horse race or other live entertainment events), and transactional capabilities (e.g., the ability to accept wagers on sporting events such as the horse race or participate in a game show). In one embodiment, the system comprises a content delivery network to store or deliver media data of horse racing, a server to store or distribute real-time data pertinent to wagering, and a time synchronization module to communicate with the content delivery network and server. In one embodiment, the time synchronization module receives the media and real-time wagering data, identifies temporal data associated with each, and combines the media and real-time wagering data to output an integrated data feed containing time-synchronized media and wagering data. The system also comprises a contextual relating module, allowing contextually relevant asynchronous information to be presented along with the real-time media and data in a user interface.

In one embodiment, this system and method allows a user to simultaneously view and wager on horse racing using a single application. This is done via high-quality user interface with which the user may interact using a variety of widgets, either translucent or presented alongside the primary viewing pane. Such widgets allow the user to perform a plurality of tasks related to viewing horse races, handicapping horse races, wagering on horse races, researching the results of previous horse races, socializing with other users, etc. In one embodiment, the user may perform these tasks as they relate to a plurality of race tracks with concurrent racing using a single display. In some embodiments, users may personalize the interface, selecting and arranging widgets according to their preference.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying FIGS. It is noted that wherever practicable similar or like reference numbers may be used in the FIGS. and may indicate similar or like functionality. The FIGS. depict embodiments of the disclosed system (or method) for purposes of illustration only. One skilled in the art will readily recognize from the following description that alternative embodiments of the structures and methods illustrated herein may be employed without departing from the principles described herein.

In addition, the language used in the specification has been principally selected for readability and instructional purposes, and may not have been selected to delineate or circumscribe the disclosed subject matter. Accordingly, the disclosure is intended to be illustrative, but not limiting, of the ultimate scope of protection.

For example, the disclosed embodiments are discussed primarily in the context of viewing horse racing and wagering on horse racing, but it is noted that the principles disclosed herein may be applied beyond viewing and wagering on horse racing. For example, the disclosed embodiments could enable an end user to participate in any live broadcasted event in real-time over the Internet either alone or with others by generating and distributing an interactive multimedia experience. The end user could view and/or interact with (e.g., wager on) any sporting event. Additionally, the end user could view a concert remotely while socially interacting with other remote viewers. The end user could participate in a fantasy football league while simultaneously viewing football games, socially interacting with other members of the league, and executing either transactions (e.g., friendly wagering on football games or purchasing merchandise) or non-monetary transactions (e.g., adjusting a fantasy football roster). Online poker tournaments could be augmented with live video of participants and contextually relevant data, including full replay capabilities of all presented data for researching and analyzing player tendencies. As another example, the end user could view a game show while remotely participating in the game show. Innumerable varieties of multimedia interaction can be implemented via the principles disclosed herein.

System Architecture

Figure 1:
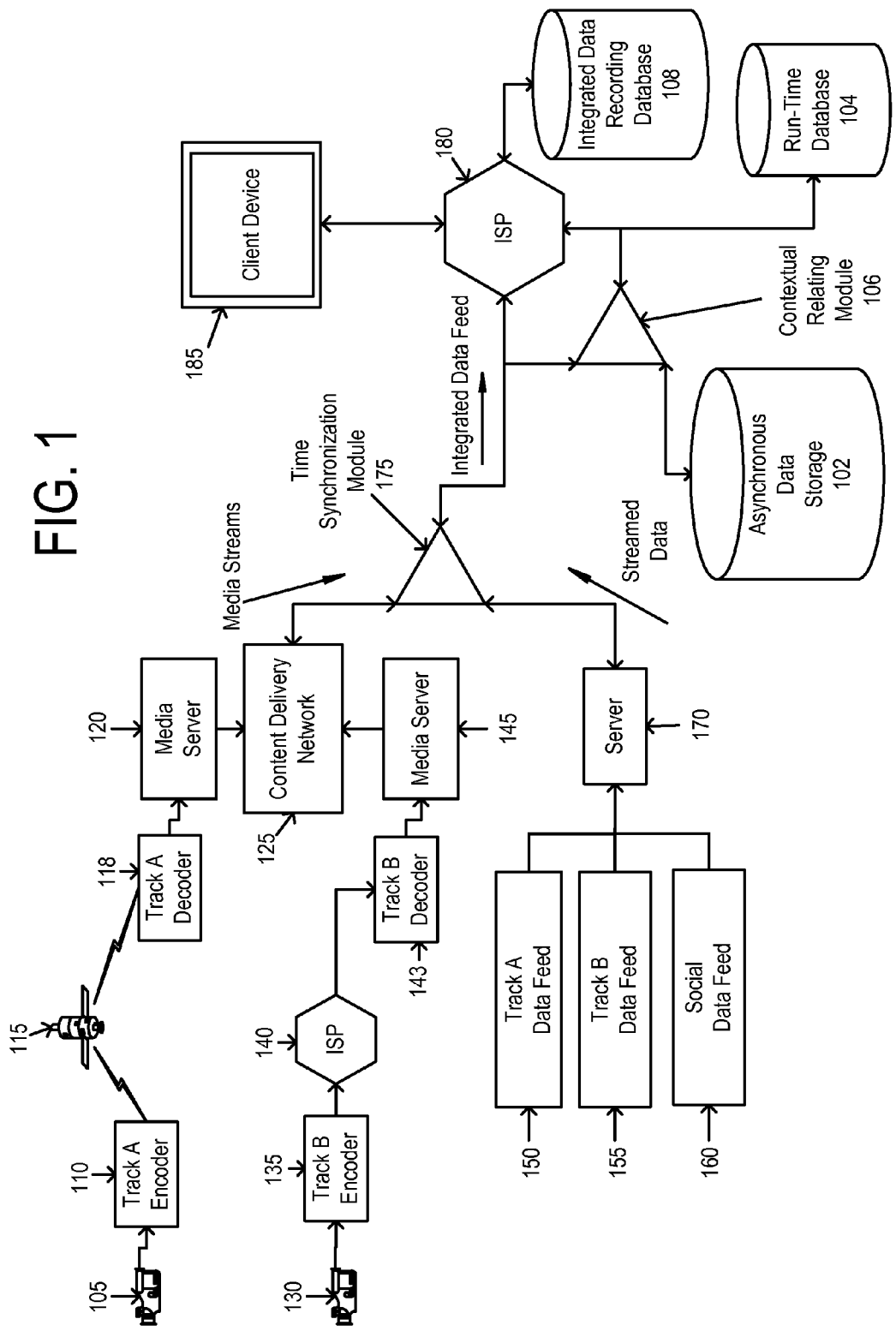
FIG. 1 is a block diagram of a system for delivering an integrated data feed including media and wagering data along with asynchronous information relevant to the media according to one embodiment.

FIG. 1 shows a block diagram of a system for generating, recording, distributing, and playing back an integrated data feed that includes live video of one or more horse races, additional real-time data such as wagering data or social interaction data, along with contextually relevant asynchronous data. For illustrative purposes, the embodiments disclosed herein, such as that depicted in FIG. 1, focus on Internet-based implementations wherein content (e.g., the integrated data feed) is primarily distributed over the Internet and primarily interacted with using a client computing device, for example, a personal computer. Other examples of client devices include notebook computers, laptop computers desktop computers, pocket computers, personal digital assistants, smart phones, mobile telephones, video game consoles, digital media devices, internet connected televisions, and the like. However, the disclosed embodiments are not limited to such implementations, but rather are provided solely for illustrative purposes. Other systems that combine media and data as disclosed herein may be implemented using any suitable mediums for distributing and interacting with the content of interest. Additionally, the data feeds, media feeds, and databases depicted in FIG. 1 may exist or be fed from any location on a network, and no restrictions are necessary regarding their physical location. In some embodiments, the architecture of the system may be completely virtual. Further, it is anticipated that other communication and interaction techniques, systems, and mediums may exist or may be developed in the future, for which the disclosed embodiments may readily be adapted.

In one embodiment, the integrated data feed includes media (comprising video and audio) and real-time data pertinent to wagering for one or more horse races occurring at one or more race tracks. For purposes of illustration, FIG. 1 shows an embodiment in which races are simultaneously occurring at two tracks, Track A and Track B. Other embodiments accommodate multiple races at a larger number of tracks. For example, one embodiment generates and distributes media and wagering data for seventy racetracks simultaneously. In addition to two media recording devices 105 and 130, the embodiment shown in FIG. 1 comprises two media encoders 110 and 135, a satellite 115 communication link, an Internet service provider (ISP) 140, two decoders 118 and 143, two media servers 120 and 145, a content delivery network 125, a Track A data feed 150, a Track B data feed 155, a social data feed 160, a server 170 (e.g., a web server), a time synchronization module 175, an Internet service provider (ISP) 180, a client device 185, an asynchronous data storage 102, a run-time database 104, an integrated data recording database 108, and a contextual relating module 106.

The media recording device 105 is coupled to the encoder 110, which is communicatively coupled to the decoder 118 and the media server 120 via the satellite 115 link. The media recording device 130 is coupled to the encoder 135, which is communicatively coupled to the decoder 143 and the media server 145 via the ISP 140. The media server 120 and the media server 145 are coupled to the content delivery network 125, which is coupled to the time synchronization module 175. The Track A data feed 150, the Track B data feed 155, and the social data feed 160 are coupled to the server 170, which is coupled to the time synchronization module 175. The time synchronization module 175 is communicatively coupled to the client device 185 and the contextual relating module 106 via the ISP 180. The contextual relating module 106 is also communicatively coupled to the asynchronous data storage and the run-time database 104. The run-time database 104 and the integrated data recording database 108 are also communicatively coupled to the client device 185 via the ISP 180. The client device 185 can comprise any device or collection of devices that enables the end user to interact with media and related data provided by the time synchronization module 175, the contextual relating module 106, and the run-time database 104. For example, the client device 185 can comprise a conventional personal computer, a handheld device such as a mobile phone, a gaming console, a cable set-top box, a standard or high-definition television, or any other Internet-capable media device or any combination thereof.

In one embodiment, media recording devices 105, 130 are used at each track to capture live media (including video, audio, and data) of the races and/or race preparation. Media recording device 105 generates media data for Track A and media recording device 130 generates media data for Track B. In other embodiments, multiple media recording devices can be located at a single track and generate multiple media streams for a single race. An encoder 115, 140 encodes the media for transmission to decoders 118, 143 and media servers 120, 145 as one or more media streams. As shown by FIG. 1, transmission of the media streams output by the encoders 115, 140 to the decoders 118, 143 and media servers 120, 145 can be accomplished via a media content collection and delivery mechanism, for example, a satellite 115, an Internet service provider (ISP) 140, or via any other suitable method of transferring media data between multiple devices. Encoding and decoding the media prior to and after transmission protects the media from unauthorized access as it is transmitted.

After the encoded media has been decoded by the decoders 118, 143, the media servers 120, 145 convert the media into one or more internet-deliverable streams. The media servers 120, 145 can generate multiple media streams having multiple quality levels (e.g., levels of video resolution and/or different bitrates). For example, the media servers 120, 145 can each output four media streams having four distinct bitrates for each race. In one embodiment, the four bitrates are a very low bitrate suitable for presenting a thumbnail-sized video of the race and three bitrates (low, medium, and high) for presenting video of the race in a primary viewing screen. Hence, in an embodiment wherein seventy races occur simultaneously, two-hundred and eighty media streams can be generated and delivered (four streams having different bitrates for each race.

In one embodiment, a content delivery network (CDN) 125 receives the media streams from a plurality of tracks and communicates the received media streams to a time synchronization module 175. The CDN 125 uses networked computers which cooperate to transfer the media streams to end users. In other embodiments, any suitable system for transferring media content could be employed. The time synchronization module 175 receives the media streams and other real-time data feeds related to viewing, wagering on, and/or discussing horse races, identifies temporal information within the received data, and combines the media streams and real-time data in a time-synchronized manner to produce an integrated data feed, as described below in conjunction with FIG. 3. A feed is a mechanism for delivering data from a data source. A media stream is a particular type of feed that includes media data. In one embodiment, an integrated data feed is a feed that includes both media data from a media stream and non-media data either based on or extracted from data included in another type of data feed. Such vocabulary is utilized herein for the sake of clarity only.

In one embodiment, the time synchronization module 175 receives the real-time data from data feeds via a server 170. There is at least one real-time track data feed 150, 155 for each track being monitored. A track data feed 150, 155 can comprise many types of information of interest to someone wagering on a horse race. In one embodiment, the track data feeds 150, 155 include data comprising information on the racing program, race status and results for the track, real-time tote data (tote referring to an automated system for accomplishing tasks used in pari-mutuel wagering, such as calculating and displaying odds, receiving wagers, printing bet tickets, etc.), track condition data, such as weather and surface data at a particular track, horse condition data for one or more horses in a race and handicapping data associated with one or more horses in a race. A track data feed 150, 155 can also include some form of a clock reference, such as a signal for the opening of gates at the start of a race, to aid in time synchronization of multiple data feeds. However, the above descriptions of information included within a track data feed 150, 155 are merely examples and in other embodiments a track data feed can include any other suitable information.

In some embodiments, information described above as embedded within a track data feed 150, 155 is distributed as multiple separate real-time data feeds which can be distributed from a centralized location, not from each track individually. For example, tote data may be sent from individual tracks to a centralized location and subsequently re-distributed via a server 170 at the centralized location in a hub-and-spoke type system. In such embodiments, centralizing the feeds beneficially allows tote data to be distributed with other data, e.g., coordinated advertising data, from a central service. Additionally, any centralized feeds can be further synchronized with the media streams by the time synchronization module 175.

In one embodiment a social data feed 160 is also received by the time synchronization module 175. The social data feed 160 facilitates interaction between users of the system, allowing them to communicate with each other about previous, ongoing, or future races. The social data feed 160 also allows for maintenance of a social network of friends within a user community, or leader boards based on user wagering performance. Additionally, the social data feed 160 makes possible the creation and maintenance of player pools to use money pooled from multiple users for placing wagers, the placement of intra-user wagers, or the organization of user leagues. In other embodiments, the time synchronization module 175 receives any number of other real-time data feeds designed to enhance the user experience.

In one embodiment, the time synchronization module 175 uses a time reference to output an integrated data feed comprising both media content and real-time data associated with each currently monitored race. The integrated data feed ensures that, for each race, presented media and real-time data are synchronized in time. The integrated data feed can comprise media data with sufficient pixel resolution to satisfy varying video formats, for example, 920p, 1080i, 1080p, or other suitable formats for high-definition displays. In one embodiment, the integrated data feed output by the time synchronization module 175 is transmitted via an Internet service provider 180 to a personal computer for presentation to an end user. Alternatively, the integrated data feed may be transmitted to the end user via any other suitable means.

In one embodiment, the integrated data feed output by the time synchronization module 175 is also received by a contextual relating module 106. The contextual relating module 106 receives data from the time synchronization module 175 and from other external sources (not shown), determines context for the received data, stores data in the various databases comprising the asynchronous data storage 102, and creates one or more ontologies to represent contextual relationships within the data. In one embodiment, the contextual relating module 106 identifies the contextual relevance of all data and its relationship to one or more ontologies data using extended markup language ("XML") metadata contained in the received data. Based upon the context of the data currently being received from the time-synchronization module 175, the contextual relating module 106 retrieves from the asynchronous data storage 102 previously stored data that is contextually relevant to the currently received or streamed data and stores that data in the run-time data base 104, thereby making contextually relevant asynchronous information readily accessible to the end user in a real-time manner. The run-time database 104 can exist in memory of the client device 185 or in memory that is external to the client device 185 (e.g., server memory). In one embodiment, the run-time database 104 is completely virtual and does not require physical storage. The contextual relating module 106 can also store data from the integrated data feed in association with contextually relevant asynchronous information in the asynchronous data storage 102 and/or the integrated data recording database 108. This enables the replay at a later time of media for a live event along with time synchronized data feeds and contextually linked asynchronous data as presented at the time of the live event.

In one embodiment, the end user may choose to interact with the integrated data feed output by the time synchronization module 175 and the contextually relevant asynchronous data output by the contextual relating module 106 using an application executed by the client device 185. Details of an embodiment of the application are provided below. In such an embodiment, an end user may simultaneously view high quality video of horse racing while reviewing both real-time and asynchronous information pertinent to wagering on horse racing and placing wagers on horse racing using a single display. Other mediums such as mobile phones, personal digital assistants (PDA's), television sets, gaming consoles, or any other system with suitable communication, display, and processing capabilities may also be used. The application run by the client device 185 queries the run-time database 104 via the ISP 180 to retrieve and display information based on the contextually relevant asynchronous data output by the contextual relating module 106. The application can also present replays of live events by, in one embodiment, querying the integrated data recording database 108 to retrieve data included in a previously distributed integrated data feed along with associated contextually relevant asynchronous data. Hence, replays can recreate a live event as would have been originally presented, including media content with time-synchronized real-time data and contextually linked asynchronous data that was originally presented with the media content.

Figure 2:
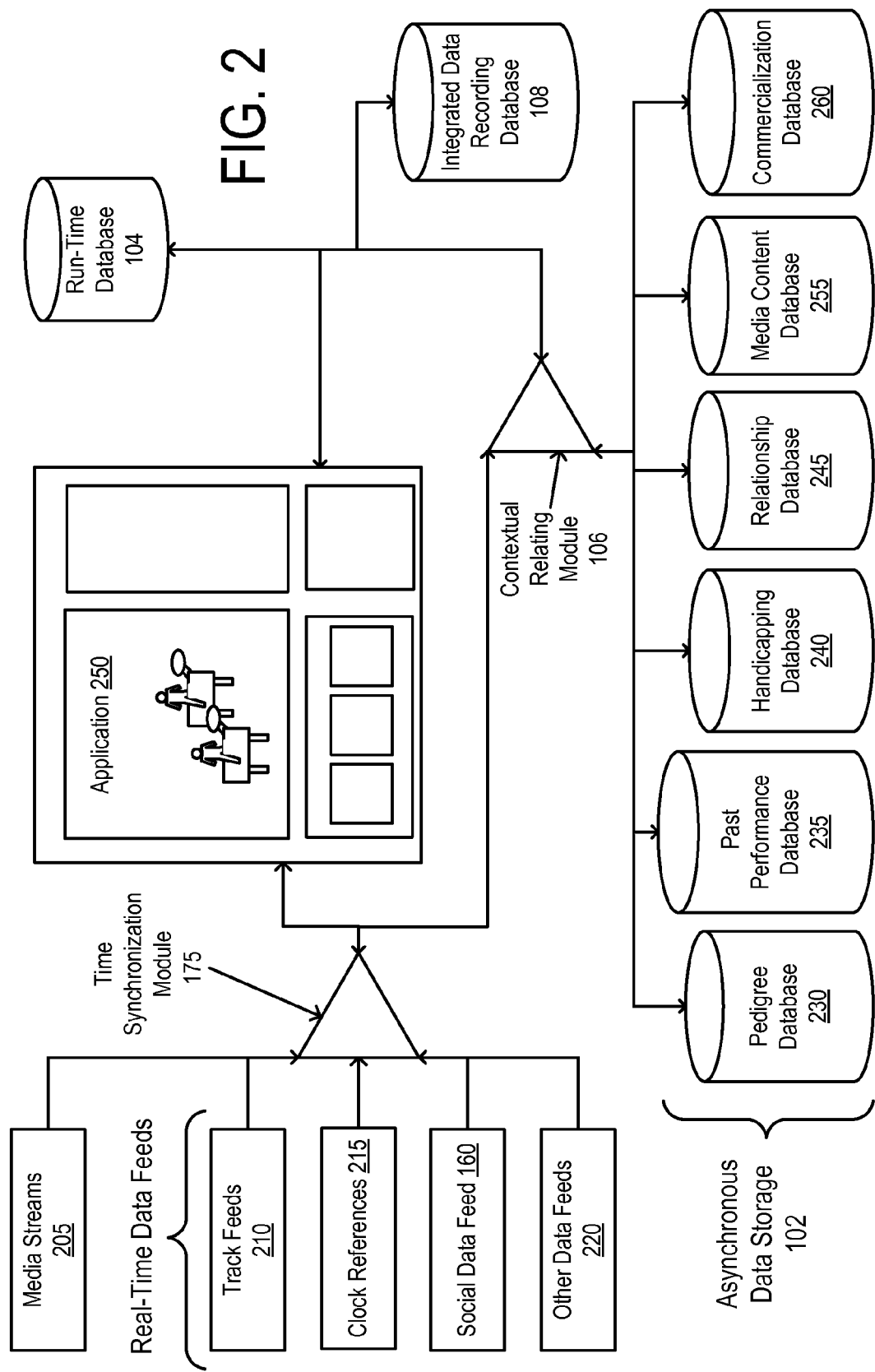
FIG. 2 is a block diagram of a system detailing the interaction between a time synchronization module for sending real-time data, a contextual relating module for sending asynchronous data, and a computer application for presenting data.

Turning next to FIG. 2, it illustrates a system diagram detailing interactions between a computer application 250 and multiple data sources according to one embodiment. The application 250 comprises a user interface 250 and part of a system that also comprises media streams 205, multiple real-time data feeds (track feeds 210, clock references 215 which may or may not be embedded within track feeds 210, a social data feed 160, and other data feeds 220), the time synchronization module 175, the asynchronous data storage 102 which includes a pedigree database 230, a past performance database 235, a handicapping database 240, a relationship database 245, a media content database 255, and a commercialization database 260, the contextual relating module 106, the run-time database 104, and an integrated recording database 108.

As discussed in relation to FIG. 1, the real-time data feeds 210, 215, 160, 220, the media streams 205, and the various databases depicted in by the embodiment of FIG. 2 can exist or be fed from any location on a network. No restrictions should be inferred from FIG. 2 regarding their physical location. In some embodiments, the architecture of the system is completely virtual. Further, it is anticipated that other communication and interaction techniques, systems, and mediums may exist or may be developed in the future, for which the disclosed embodiments may readily be adapted.

The media streams 205 and the multiple real-time data feeds 210, 215, 160, 220 are all communicatively coupled to the time synchronization module 175. The time synchronization module 175 is additionally coupled to the application 250 and the contextual relating module 106. The multiple databases of the asynchronous data storage 102 are each communicatively coupled to the contextual relating module 106. The contextual relating module 106 is further communicatively coupled to the application 250, the run-time database 104, and the integrated recording database 108. The run-time database 104 is communicatively coupled to the application 250. The integrated data recoding database 108 is also communicatively coupled to the application 250.

The media streams 205 can be "push feeds" that are fed to the time synchronization module 175 as determined by the CDN 125 or can be "pull feeds" that are only sent to the time synchronization module 175 in response to a specific request by the time synchronization module 175. In one embodiment, the time synchronization module 175 requests particular media streams 205 from the CDN 125 based on commands transmitted by the application 250 in response to selections by the end user. Similarly, the real-time data feeds 210, 215, 160, 220 can be push feeds or pull feeds. In one embodiment, the time synchronization module 175 can request particular real-time data feeds 210, 215, 160, 220 based on which media streams 205 are received from the CDN 125 or can request particular real-time data feeds 210, 215, 160, 220 based on commands transmitted by the application 250 in response to selections by the end user. As previously described, the time synchronization module 175 takes received media streams 205 and real-time data feeds 210, 215, 160, 220 and outputs an integrated data feed that includes both media content and real-time data associated with one or more currently monitored races. The integrated data feed ensures that, for each monitored race, observed media and real-time data correspond to the same moment in time. In one embodiment, the time synchronization module 175 synchronizes media streams 205 and corresponding real-time data feeds 210, 215, 160, 220 and sends them as separate yet time-synchronized data feeds to the application 250.

The application 250 receives the integrated data feed from the time synchronization module 175. In one embodiment, the application 250 comprises a graphical user interface (GUI) which allows the end user to interact with the integrated data feed. For example, the end user can choose which race to focus on, which streamed real-time wagering and informational data to view, which contextual information to view, and can wager on races using the single application 250 and a single interface and display. In one embodiment, many of these user choices are made indirectly when the end user decides which widgets are present in the user interface at any time. For example, if the end user chooses to view a race program widget, streamed data of the horse and jockey entries and minutes-to-post for the race associated with the race program widget can be displayed. As another example, if the end user chooses to view a handicapping data widget, contextual data on a horse's past performance may be displayed. Further details of the application and its operation are provided below in reference to FIGS. 6-9.

The application 250 retrieves contextual data by querying in real-time the run-time database 104. The run-time database 104 contains data deemed by the contextual relating module 106 as contextually relevant to the integrated data feed output by the time synchronization module 175. In one embodiment, the contextual relating module 106 analyzes metadata associated with the integrated data feed to determine which data to store in the run-time database 104. The analyzed metadata can be metadata comprising XML data.

In one embodiment, the asynchronous data storage 102 includes multiple databases, for example, a pedigree database 230, a past performance database 235, a handicapping database 240, a relationship database 245, a media content database 255, and a commercialization database 260. The pedigree database 230 holds information about the pedigree of all individual horses known to the system. The past performance database 235 holds information about the performances of individual horses and jockeys and the results of all previous races known to the system. The handicapping database 240 holds information about race predictions made by various experts or automated systems which may be of interest to those placing wagers.

The media content database 255 stores previously recorded media content such as video replays of earlier races, commentaries, or other media presentations. For example, the media content database 255 can store clips or entire episodes of television programs comprising race analysis and discussion for on-demand presentation by the application 250. In one embodiment, the media content database 255 stores data from the integrated data feed in association with contextually relevant asynchronous information in the asynchronous data storage 102. This enables the application 250 to replay media for a race or other live event along with time synchronized data feeds and contextually linked asynchronous data that were presented at the time of the live event, thereby recreating the experience of the initial multimedia presentation and/or interaction. In other embodiments, data from previously generated integrated data feeds and associated contextually relevant asynchronous data is stored in the integrated data recording database 108. The application 250 presents such previously recorded media content as requested by the end user by retrieving data from the media content database 255 and/or the integrated data recording database 108.

The commercialization database 260 stores data related to financial aspects of the system. In one embodiment, commercialization database 260 stores log in credentials (e.g., usernames and passwords) and other user-specific data such contact and address information, financial information, wagering histories, and other personal information for end users. The commercialization database 260 can also store data for advertisements that are presented by the application 250 in a context-sensitive manner. Additionally, the commercialization database 260 can store data for shopping items (e.g., merchandise related to races, events, or advertisements) that can be purchased through the application 250. In one embodiment, the end user logs into the application 250 by providing log in credentials and can purchase the shopping items directly through the application 250 which accesses the user-specific data stored in the commercialization database 260. Such purchases can be made using a single click, keystroke, or other preprogrammed input. In other embodiments, other databases may exist within the asynchronous data storage for storing other varieties of asynchronous data, such as third-party databases, web servers, advertising networks, and advertising servers.

The contextual relating module 106 analyzes the data contained in the pedigree database 230, the past performance database 235, the handicapping database 240, the media content database 255, and the commercialization database 260. In one embodiment, the contextual relating module 106 forms one or more ontologies based on relationships among the stored data. The one or more ontologies provide an index for the metadata associated with the stored data. For example, there may be a pedigree ontology, a past performance ontology, a handicapping ontology, a media content ontology, and a commercialization ontology. The one or more ontologies are stored in the relationship database 245. By accessing the relational database 245, the contextual relating module 106 is able to quickly identify data stored by the asynchronous data storage 102 that is contextually relevant to the integrated data feed, retrieve that data from the other databases 230, 235, 240, 255, 260 of the asynchronous data storage 102 and store it in the run-time database 104, thereby making contextually relevant asynchronous data quickly accessible for the application 250.

It should be noted that the systems described above with respect to FIGS. 1 and 2 are suitable for generating, distributing, and recording many types of media content in manner that is synchronized and contextually linked with relevant data. In addition to live media (e.g., of an event such as a horse race, sporting event, concert, etc.), stored replays of previously recorded live events, previously recorded traditional media such as video clips and television-style programs, as well an online television network can be distributed as described above. For example, an interactive game show in which members of the viewing audience can participate via client device 185 could be recorded and distributed as described above.

Figure 3:
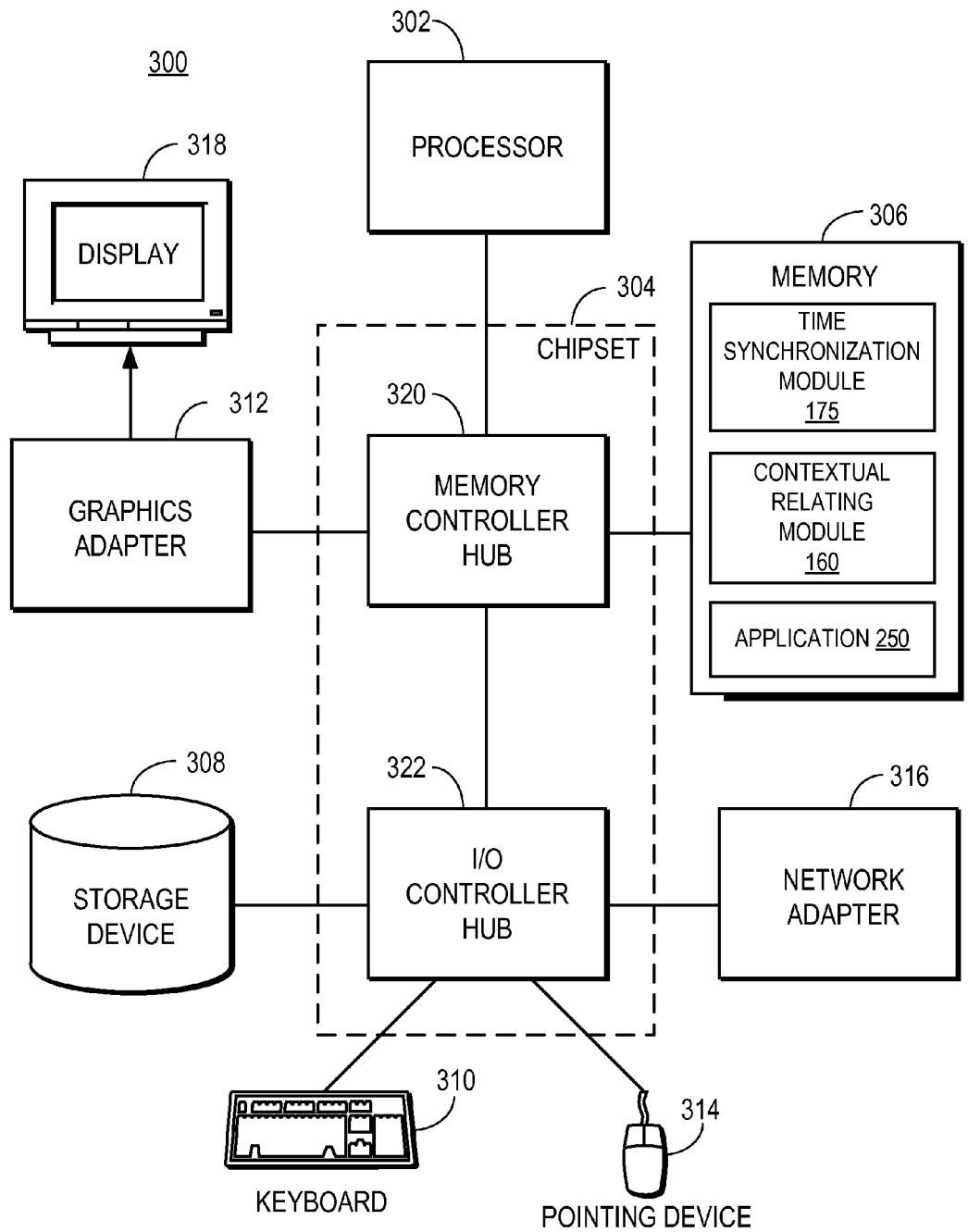
FIG. 3 is a high-level block diagram illustrating an example of a system for use as a time synchronization module, a contextual relating module, and/or as a client device according to one embodiment.

FIG. 3 is a high-level block diagram illustrating on example of a system 300 that implements or executes the time synchronization module 175, the contextual relating module 106, and/or the application 250. In the embodiment depicted in FIG. 3, the hardware elements of the system 300 comprise the time synchronization module 175, the contextual relating module 106, and the application 250. However, in other embodiments, one or more of the time synchronization module 175, the contextual relating module 106, and the application 250 are implemented separately by communicatively coupled systems which comprise hardware elements similar to those of the illustrated system 300.

The illustrated embodiment of system 300 includes at least one processor 302 coupled to a chipset 304. The chipset 304 includes a memory controller hub 230 and an input/output (I/O) controller hub 322. A memory 306 and a graphics adapter 312 are coupled to the memory controller hub 230, and a display 318 is coupled to the graphics adapter 312. A storage device 308, keyboard 310, pointing device 314, and network adapter 316 are coupled to the I/O controller hub 322. Other embodiments of the system 300 can have different architectures. For example, the memory 306 is directly coupled to the processor 302 in some embodiments.

The system 300 is adapted to execute computer program modules for providing the functionality described herein. As used herein, the term "module" refers to computer program logic configured and used to provide the specified functionality. Thus, a module can be implemented in hardware, firmware, and/or software. In one embodiment, program modules are stored on the storage device 308, loaded into the memory 306, and executed by the processor 302. The storage device 308 is a computer-readable storage medium such as a hard drive, compact disk read-only memory (CD-ROM), DVD, or a solid-state memory device. The memory 306 is also a computer-readable storage medium and stores computer-executable instructions and data used by the processor 302.

In one embodiment, the memory 306 stores computer-executable instructions that cause the processor 302 to execute one or more processes and thereby implement the operations described herein for at least one of the time synchronization module 175, the contextual relating module 106, and the application 250. Accordingly, the computer-executable instructions stored by the memory can comprise instructions for the time synchronization module 175, the contextual relating module 106, and the application 250 as shown in FIG. 3.

The pointing device 314 is a mouse, track ball, or other type of pointing device, and is used in combination with the keyboard 310 to input data into the computer system 300. Other embodiments of the system 300 can also include input devices such as a remote control, a video game controller, a joystick, a touchpad, or a touch screen. The graphics adapter 312 displays images and other information on the display 318. The network adapter 316 couples the computer system 300 to the network 190. Some embodiments of the system 300 have different and/or additional components compared to those shown in FIG. 3. Other embodiments of the system 300 lack some of the components than those shown in FIG. 3. For example, the application 250 can be executed by a mobile telephone or other handheld device with limited processing power, a small display 318, and possibly lacking a pointing device 314. A server providing a time synchronization module 175 or a contextual relating module 106, in contrast, might comprise multiple blade servers working together to provide the functionality described herein.

Integration of Media Streams and Real-Time Data Feeds

Figure 4:
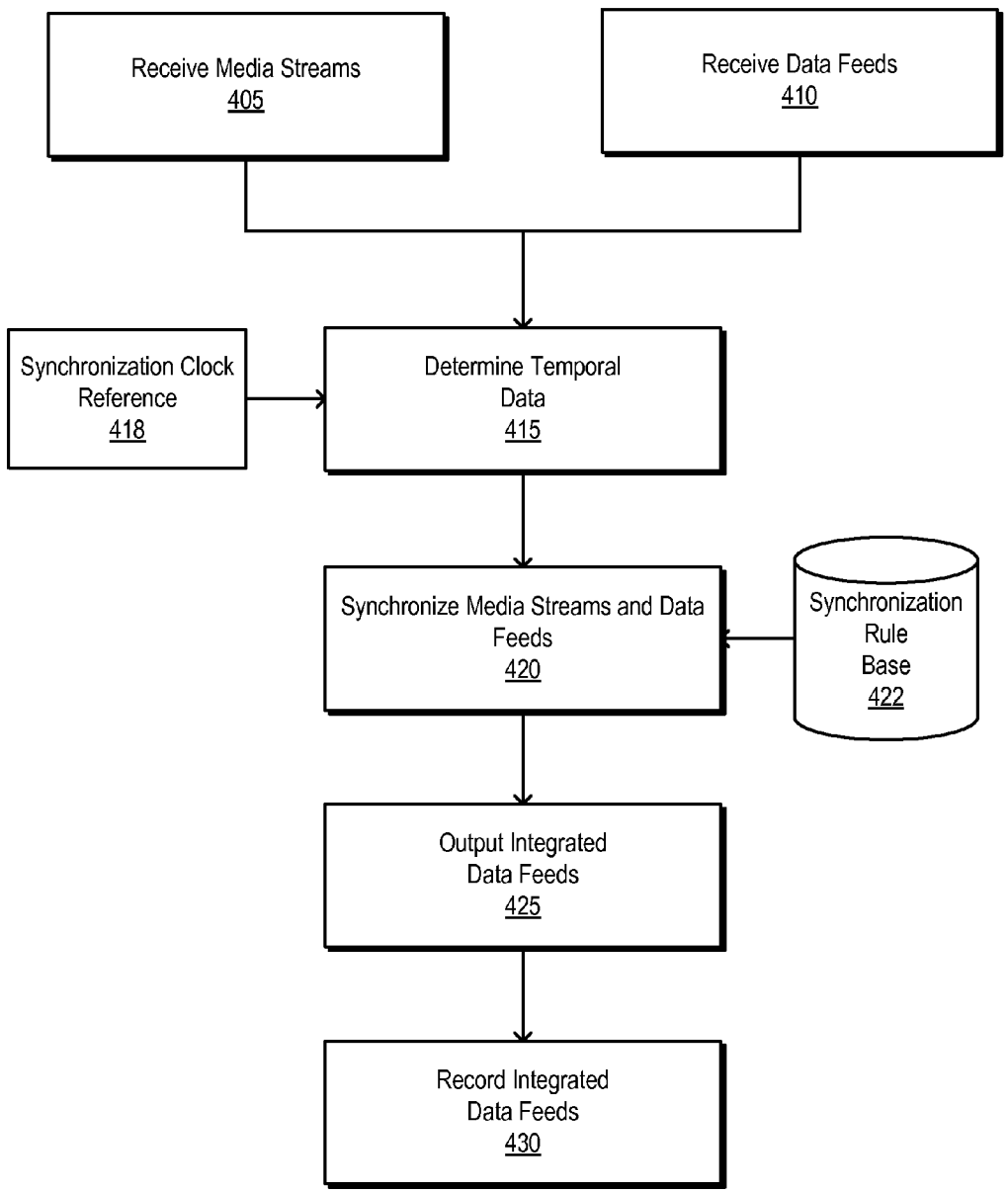
FIG. 4 is a flowchart of a method for generating and recording an integrated data feed including time-synchronized media and wagering data associated with the video according to one embodiment.

FIG. 4 shows a flowchart illustrating steps taken by the time synchronization module 175 to output 425 an integrated data feed according to one embodiment. In one embodiment, steps of the process illustrated in FIG. 4 are carried out by the processor 302 of a system similar to that illustrated in FIG. 3. A set of computer-executable instructions is stored by a computer-readable storage medium (e.g., memory 306). When executed by the processor 302, the set of computer-executable instructions cause the processor to carry out the actions discussed below in reference to FIG. 4. The set of computer-executable instructions can be referred to as the time synchronization module 175. Alternatively, the hardware elements of the system 300 used to implement the actions herein ascribed to the time synchronization module 175 can also be referred to as the time synchronization module 175.

Initially, the time synchronization module 175 receives 405 one or more real-time media streams 205 and/or receives 410 one or more real-time data feeds. A media stream or data feed can be received 405, 410 as either a push feed or as a pull feed. In one embodiment, the time synchronization module 175 requests a corresponding real-time data feed in response to receiving 405 a media stream 205 or similarly requests a corresponding media stream 205 in response to receiving 410 a real-time data feed. For example, the application 250 can transmit a command to the time synchronization module 175 to receive 405 a particular media stream 205 based on input received from the end user, causing the time synchronization module 175 to request and receive 410 a corresponding data feed for time synchronization with the media stream 205. Alternatively, the application 250 can transmit a command to the time synchronization module 175 to receive 410 a particular data feed based on input received from the end user, causing the time synchronization module 175 to request and receive 405 a corresponding media stream 205 for time synchronization with the data feed. In various embodiments, the received 410 real-time data feeds can comprise track feeds 210 for each race being monitored, clock references 215 which may or may not be part of the track feeds 210, a social data feed 140, or any other data feeds 220 related to racing activity as previously discussed in reference to FIGS. 1 and 2.

The time synchronization module 175 determines 415 temporal data associated with the received 405, 410 real-time media feed 205 and real-time data feed. In one embodiment, the time synchronization module 175 determines 415 the temporal data based on a synchronization clock reference 418. The synchronization clock reference 418 provides a time reference that serve as the temporal basis of the synchronization process. The synchronization clock reference 418 can be a local server clock reference for a server device that implements the time synchronization module 175 or can alternatively be a universal time clock.

The time synchronization module 175 then synchronizes 420 the received media stream 405 and data feed 410 based on the determined 415 temporal data and a synchronization rule base 422. The synchronization rule base 422 comprises a stored set of rules based on characteristics of media streams 205 and data feeds that governs the synchronization process. For example, the synchronization rule base 422 can comprise latency relationships between various media streams 205 and/or data feeds (e.g., the tote data feed from Track A always leads the media stream 205 for Track A by 2.5 seconds). In one embodiment, the time synchronization module 175 is further configured to analyze latencies of media streams 205 and data feeds and update the synchronization rule base 422 as necessary.

In one embodiment, synchronizing 420 a media stream and a data feed comprises interlacing data from the data feed (e.g., XML data) within media data of the media stream having corresponding temporal data to create a single stream. In another embodiment, synchronizing 420 a media stream and a data feed comprises adding time stamps to data from the data feed (e.g., creating a time-stamped XML data feed). The time stamps can be added as metadata. Additional metadata can be added, such as an event ID that identifies the live event corresponding to the data feed and/or an owner ID that identifies an entity having proprietary rights to the data feed. In such an embodiment, the time synchronization module 175 produces a plurality of synchronized 420 media streams 205 and data feeds that include temporal data, thereby enabling the application 250 to subsequently present them simultaneously to the end user in a time-synchronized manner.

Synchronizing 420 the media content and real-time data using the associated timestamps in this way allows the time synchronization module 175 to transform data included in one or more media streams 205 and data included in one or more real-time data feeds into one or more integrated data feeds that includes media and real-time data associated with segments of the media. The time synchronization module 175 then outputs 425 the integrated data feeds. After passing through the time synchronization module 175, the integrated data feed can be contextualized (e.g., processed and transformed by the contextual relating module 106) before being displayed or recorded. The time synchronization module 175 can also record 430 the integrated data feeds in the integrated data recording database 108 for later retrieval. In one embodiment, the time synchronization module 175 transmits the integrated data feed to the contextual relating module 106 and commands the contextual relating module 106 to store the integrated data feed along with contextual data in the integrated data recording database 108 for later retrieval. As described above, the integrated data feed can be recorded and stored in an interlaced form (e.g., data from the received 410 data feed interlaced with media data of the received 405 media stream) or in a separated but time-stamped form (e.g., data from the data feed that includes added time stamps along with data from the media stream that includes added time stamps) that enables recreation of the integrated data feed.

Note that FIG. 4 depicts a process followed by a time synchronization module 175 according to only one embodiment. The embodiments herein are described in the context of the embodiment of FIG. 4, but this is solely for illustrative simplicity and shall not be construed as limiting in any manner. Logic or processing requirements may give rise to slightly altered processes. In other embodiments, there may be multiple integrated data feeds produced by a single time-synchronization module 175, an integrated data feed produced by multiple time-synchronization modules 175, or any combination thereof.

Integration of Integrated Data Feeds and Contextual Data

Figure 5:
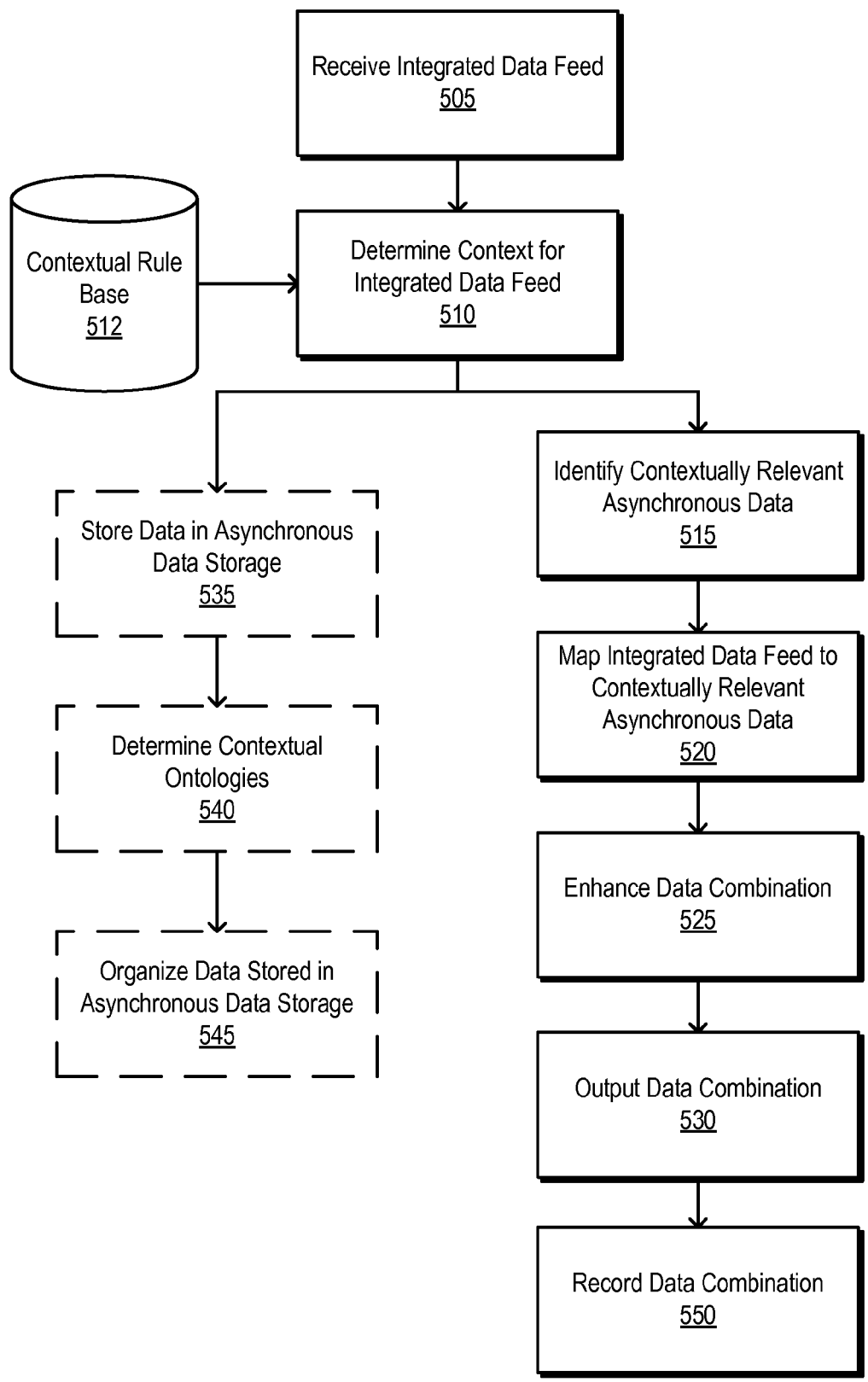
FIG. 5 is a flowchart of a method for outputting asynchronous data that is contextually relevant to the integrated data feed according to one embodiment.

FIG. 5 shows a flowchart illustrating steps taken by the contextual relating module 106 to provide asynchronous data to the run-time database that is contextually relevant to the integrated data feed output by the time synchronization module 175 according to one embodiment. In one embodiment, steps of the process illustrated in FIG. 5 are carried out by the processor 302 of a system similar to that illustrated in FIG. 3. A set of computer-executable instructions is stored by a computer-readable storage medium (e.g., memory 306). When executed by the processor 302, the set of computer-executable instructions cause the processor to carry out the actions discussed below in reference to FIG. 5. The set of computer-executable instructions can be referred to as the contextual relating module 106. Alternatively, the hardware elements of the system 300 used to implement the actions herein ascribed to the contextual relating module 106 can also be referred to as the contextual relating module 106.

Initially, the contextual relating module 106 receives 505 the integrated data feed output by the time synchronization module 175. The contextual relating module 106 then determines 510 at least one context for the received 505 integrated data feed. A context can be an association with a particular race, race participant, race venue, track condition or any other suitable contextual characterization related to a live event. In one embodiment, the contextual relating module 106 determines 510 a context by analyzing metadata associated with data included in the received 505 integrated data feed (e.g., the received 505 integrated data feed can be in an XML format and include XML metadata comprising an event code, a track code, or a filename). The contextual relating module 106 can also determine 510 a context based on a data source for the received 505 integrated data feed (e.g., the media data in the integrated data feed includes data or metadata that indicates the media was recorded at a particular horse race or race track). The contextual relating module 106 can also determine 510 a context based on URL information associated with the received 505 integrated data feed (e.g., the integrated data feed was transmitted over the ISP 180 from a URL associated with the context). Determining 510 a context can comprise accessing a contextual rule base 512 that stores rules specifying relationships between contexts and contextual indicators.

Once a context for the received 505 integrated data feed has been determined 510, the contextual relating module 106 identifies 515 contextually relevant asynchronous data (i.e., data stored in the asynchronous data storage 102 that is associated with the determined 510 context). In one embodiment, the contextual relating module 106 identifies 515 contextually relevant asynchronous data using one or more ontologies by which the asynchronous data is organized.

After determining 510 the context for the integrated data feed and identifying 515 contextually relevant asynchronous data, the contextual relating module 106 maps 520 the integrated data feed to the contextually relevant asynchronous data. In one embodiment, mapping 520 the integrated data feed to the contextually relevant asynchronous data comprises modifying the data or creating metadata that associates the contextually relevant asynchronous data with data of the integrated data feed.

Optionally, the contextually relating module 106 can then enhance 525 the data combination created by the mapping 520 process by analyzing the data combination and creating new data and/or data fields to further capture contextual relationships within the data combination. Whether or not the enhancing 525 step is implemented, the contextual relating module 106 outputs 530 the data combination to the run-time database 104, thereby making it readily accessible to the application 250. The contextual relating module 106 also records 550 the data combination comprising the integrated data feed and contextually relevant asynchronous data, for example, in the integrated data recording database 108. Recording 550 the data combination enables the application 250 to present a replay at a later time of media for a live event along with time synchronized data feeds and contextually linked asynchronous data as presented at the time of the live event. Thus, replays can recreate a live event as would have been experienced at the time of its original presentation, complete with time-synchronized real-time data and contextually linked asynchronous data that was originally presented with the live media content.

As illustrated by steps 535, 540, and 545 in FIG. 5, the contextual relating module 106 can also manage the asynchronous data storage 102 in some embodiments. Optionally, steps 535, 540, 545 can be carried out offline and are illustrated in FIG. 5 using dashed lines for illustrative clarity. As used herein, offline refers to any period of time during which the contextual relating module 106 is not receiving 505 the integrated data feed from the time synchronization module 175. After determining 510 the context for the received 505 the integrated data feed, the contextual relating module 106 stores 535 data included therein in the asynchronous data storage according to the determined 510 context. Although FIG. 5 illustrates the storage 535 step as following the determining 510 step, in other embodiments the contextual relating module 106 can store 535 the integrated data stream along with the identified 515 contextually relevant data by storing 535 the data combination following either the mapping 520, enhancement 525, or output 530 steps.

The contextual relating module 106 also determines 540 one or more contextual ontologies based on relationships among the data stored in the asynchronous data storage 102. Once suitable ontologies have been determined 540, the contextual relating module 106 organizes 545 the data stored in the asynchronous data storage 102 accordingly.

Note that FIG. 5 depicts a process followed by a contextual relating module 106 according to only one embodiment. The embodiments herein are described in the context of the embodiment of FIG. 5, but this is solely for illustrative simplicity and shall not be construed as limiting in any manner. Logic or processing requirements may give rise to slightly altered processes. In some embodiments, there may be multiple communicatively coupled contextual relating modules 106 which collectively carry out the steps outlined in reference to FIG. 5.

Interaction with an Integrated Data Feed

The end user interacts with the integrated data feed and other elements of the systems described above in reference to FIGS. 1 and 2 via a computer application 250. In one embodiment, the application 250 is executed by a conventional web browser on the client device 185 of the end user. For example, the application 250 can comprise computer-executable computer program instructions in a browser-compatible scripting language such as JavaScript and be delivered to the client device 185 over a network such as the Internet. In other embodiments, the client device 185 executes the application as a stand-alone program.

In one embodiment, the end user logs into the application 250 by supplying verification credentials which the application verifies by checking corresponding data stored in the asynchronous data storage 102. Once logged in, the end user can place bets using money from a personal account via the wagering widget. Personal account information (e.g., log in credentials, account balance, wagering history, etc.) is stored in the asynchronous data storage 102.

Figure 6:
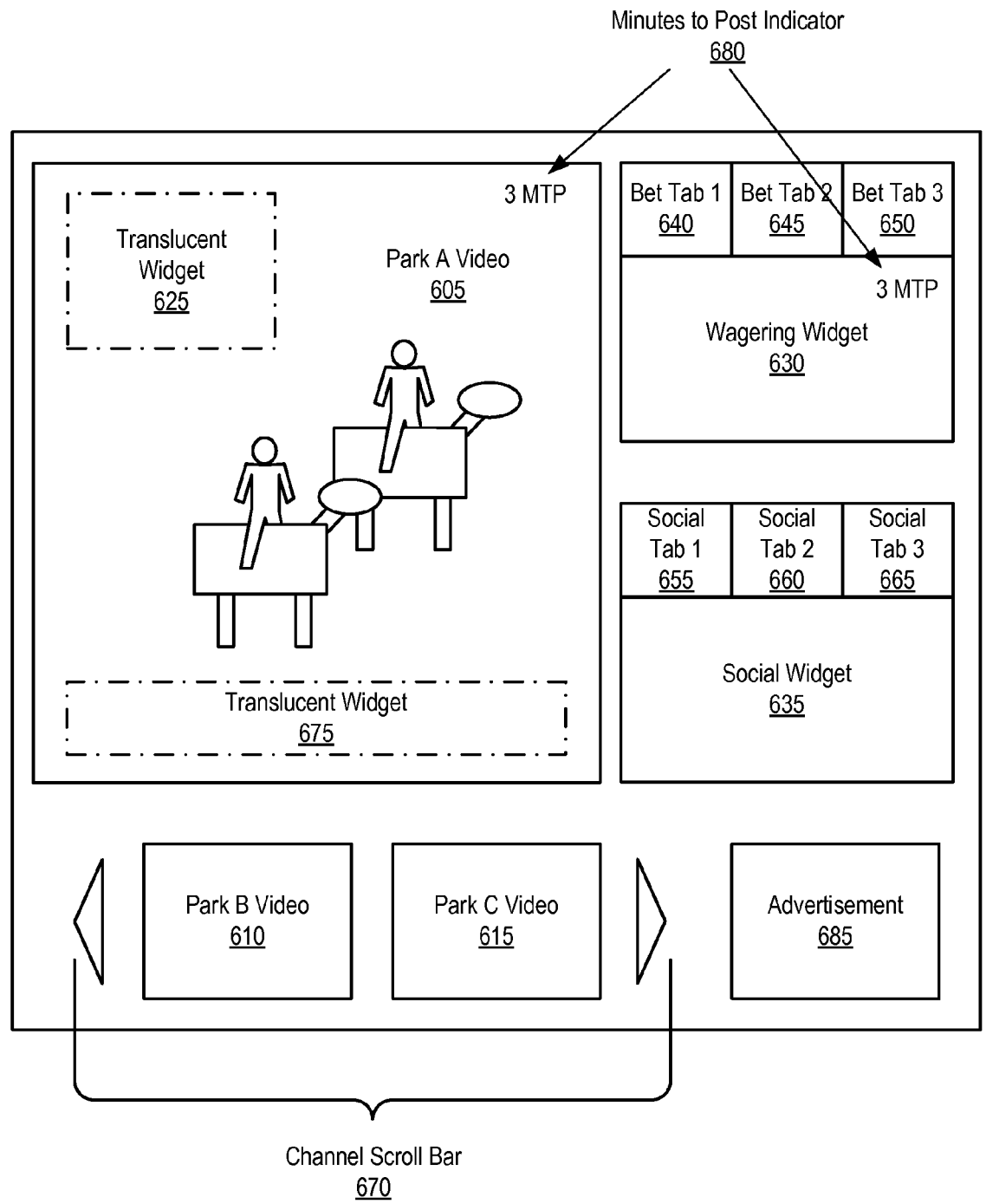
FIG. 6 is an example user interface for displaying integrated live media and wagering data associated with the media according to one embodiment.

The application 250 includes a user interface that simultaneously presents high quality real-time media of horse races, real-time and asynchronous information contextually relevant to wagering on horse races, and real-time wagering capabilities. Thus, the end user can utilize these and other features using a single application 250 and single display. FIG. 6 illustrates the user interface according to one embodiment. The user interface includes a plurality of viewing panes and/or widgets to simplify user interaction with the media content, wagering data, and wagering capabilities provided by the application 250. The application 250 accepts input from the end user specifying a wager. The application 250 then transmits data representing the wager over the ISP 180 to a tote system (e.g., a centralized wager processing system). The application 250 can also be configured to accept non-wagering monetary transactions such as merchandise purchases, deposits into a user account, etc.

In one embodiment, the user interface includes a large viewing pane 605 for watching video of or related to horse racing. The end user can request video for a specific race or race track. In some embodiments, the application 250 detects that a race is either about to begin or is ongoing and automatically presents the detected race to the end user in the large viewing pane 605. Within the viewing pane 605, the end user can activate a plurality of translucent widgets 625, 675 and thereby obtain information pertinent to the race and/or to interact with the user interface. Translucent widgets 625, 675 are visibly perceptible to the end user but do not completely obscure from view aspects of the user interface (e.g., media content presented in the viewing pane 605) that they overlap spatially. Multiple types of information are accessible through the translucent widgets 625, 675 such as: track name and location, race number, race distance, minutes to post, race purse, track weather, track surface conditions, a schedule of upcoming races, or any other relevant information. In addition to providing information, the translucent widgets 625, 675 allow the end user to modify the user interface by including video control functions (e.g., play, pause, record, volume, etc.), video search capabilities, widget management tools or other functions for interacting with video data. In one embodiment, the end user can hide the translucent widgets 625, 675 from view when they are undesired or can reposition the translucent widgets 625, 675 to any location within the viewing pane 605.

In one embodiment, widgets 630, 635 are displayed in one or more regions of the user interface outside of the viewing pane 605, allowing widgets 630, 635 to be viewed simultaneously with the viewing pane 605. In one embodiment, widgets 630, 635 allow the end user to execute one or more wagering operations and/or one or more social operations. A wagering widget 630 displays information such as real-time odds and payouts, odds trends (e.g., odds are increasing or decreasing on a particular horse), horse names and number assignments, jockey names and other information, expert analysis and picks, user-specific financial information such as a wagering account balance, or any other information pertinent to wagering on a given horse race. In certain embodiments, this information is organized into various tabs 640, 645, 650, each tab 640, 645, 650 including data associated with a certain category, simplifying access to different types of data. In one embodiment, the wagering widget 630 receives one or more user inputs to select and place wagers on a horse race or to view or modify user-specific information maintained in the asynchronous data storage 102. In one embodiment, the end user logs into the application by supplying verification credentials and, once logged in, can place bets using money from a personal account via the wagering widget. Wagering is done on a race-by-race basis or, in certain embodiments, according to methods selected or designed by the end user. For example, the end can place bets using a method which automates wagering as a function of one or more conditions associated with one or more ongoing horse races. Additionally, the end user can place a conditional wager which is not placed until one or more conditions are met (e.g. the payout of a certain wager does not drop below a certain threshold prior to a certain time before post for a given race).

In some embodiments, widgets 625, 630, 635, 675 may transform in real-time in response to changes in race status. For example, when race results become official (a status change for the race), a widget 625 which had been displaying information on the race program may automatically switch to displaying the official race results. Further, a widget 630 which had been displaying wagering information such as real-time odds and may automatically shift to displaying the official payouts for various wagers when race results become official (a status change for the race). Additionally, an indicator 680 of the minutes to post for a given race may be displayed both within the viewing pane and map to another indicator 680 displayed in the wagering widget 630. Thus, state changes within the application 250 and interface are both temporally and contextually linked in time to state changes within the races being monitored.

In one embodiment, a social widget 635 is used to facilitate one or more social tasks associated with horse race wagering. Such social tasks include, but need not be limited to, chat features with other users, maintenance of a social network of friends within a user community, or leader boards based on user wagering performance. Additionally, the social widget 635 may enable the creation and maintenance of player pools to use money pooled from multiple users for placing wagers, placement of intra-user wagers or organization of user leagues. A rule set determines whether such player pools are offered depending upon several factors including, but not limited to, the residency of the user and legal/regulatory constraints.

In one embodiment, the user interface includes a channel scroll bar 670, allowing a user to select video data from multiple sources. For example, the channel scroll bar 670 allows a user to select video from multiple tracks by selecting a thumbnail 610, 615, allowing the user to monitor occurrences at multiple tracks in addition to the one currently observed in the main viewing pane 605. As described previously with respect to FIG. 1, thumbnails 610, 615 can include video at a low resolution and/or bitrate. This allows a user to simultaneously monitor action at a plurality of tracks while focusing on a selected track using the viewing pane 605. Responsive to user input, a video in the channel scroll bar 670 is displayed in the viewing pane 605. When the video displayed in the viewing pane 605 is changed, the translucent widgets 625, 675 and other widgets 630, 635 can be modified to display or include data associated with the video currently displayed in the viewing pane 605. When the video displayed in the viewing pane 605 is modified, the video previously displayed in the viewing pane 605 is included in the channel scroll bar 670, allowing the user to continue to monitor the track. In some embodiments, a guide to ongoing or upcoming races and other media content (not shown) is also included in the user interface. The end user can access stored media content in a traditional on-demand manner.

The user interface can also include at least one advertisement 685. In one embodiment, the contextual relating module 106 outputs the advertisement 685 from the commercialization database 260 into the run-time database 104 based on contextual information, and the application 250 retrieves the advertisement 685 from the run-time database 104. Contextual information can include user-specific information retrieved in response to a log in by the end user or a keyword trigger in the social widget 635 (e.g., a specific word typed in a chat feature). The advertisement 685 can comprise text, graphic (sometimes referred to as a banner ad), interactive content (also known as rich media), or video content. The application 250 can present the advertisement 685 in any position within the user interface, including in some embodiments as overlaying the viewing pane 605 or a widget. The advertisement 685 can also be interactive and, in one embodiment, can transition from one of the aforementioned varieties of ads to a different variety or trigger an additional advertisement in response to an action by the end user. Additionally, the application 250 can enable the end user to purchase an item associated with the advertisement 685 using stored user-specific information.

Figure 7:
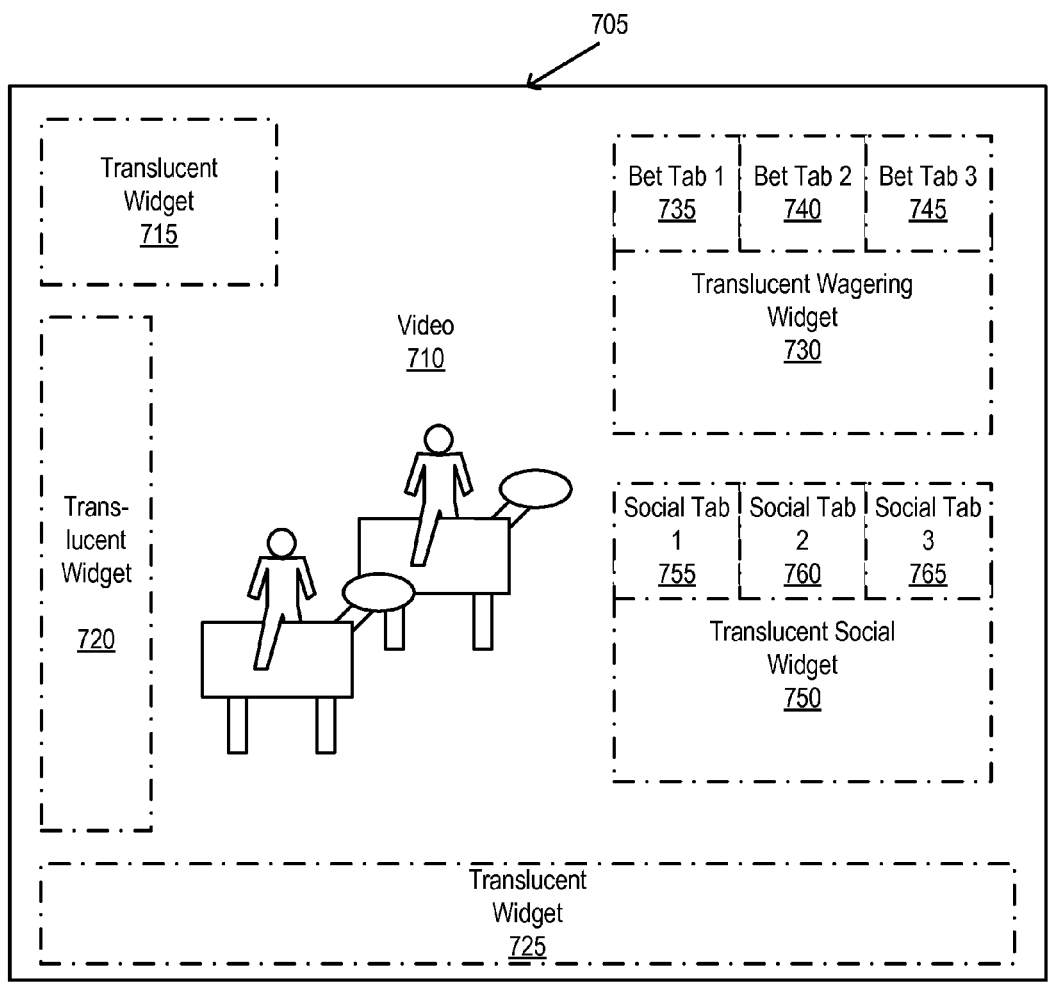
FIG. 7 is an example user interface displaying live media of a horse race integrated with wagering data associated with the horse race according to one embodiment.

FIG. 7 shows another example user interface presenting media of a horse race integrated with wagering data and capabilities associated with a horse race according to one embodiment. The user interface illustrated in FIG. 7 allows the end user to view video associated with a selected event (e.g., a horse race) in a full-screen format. In such a case, video 710 from the desired event fills the entire viewing window 705 of a device which receives the integrated data feed, improving the visual experience of the end user. Although the video 710 occupies the entire viewing window 705, one or more translucent widgets 715, 720, 725, 730, 750 allows a user to interact with the user interface to access perform one or more functions. Examples of functions implemented by the translucent widgets 715, 720, 725, 730, 750 include those discussed above in conjunction with FIG. 6. However, in other embodiments, the translucent widgets 715, 720, 725, 730, 750 can perform any other function associated with wagering on a horse race. For example, a translucent wagering widget 730 or translucent social widget 750 provides at least the same functionalities as those provided by the wagering widget 630 and social widget 635 presented in FIG. 6. Other translucent widgets 715, 720, 725 could provide any number of functions, including, but not limited to, those presented in the discussion of FIG. 6 such as video control, race information, a channel scroll bar for monitoring action at other parks or other suitable functions. The end user is able to hide, display, or position any translucent widget 715, 720, 725, 730, 750 as desired. Thus, the end user can execute any activities associated with viewing and wagering on horse racing within a single integrated application 250 and interface even while using a full-screen display to view an event such as a horse race from a specific track. In one embodiment, the application 250 communicates to the time synchronization module 175 that it has switched to a full-screen format, and, in response, the time synchronization module increases the resolution and/or bitrate of the media content included in the integrated data feed.

Figure 8:
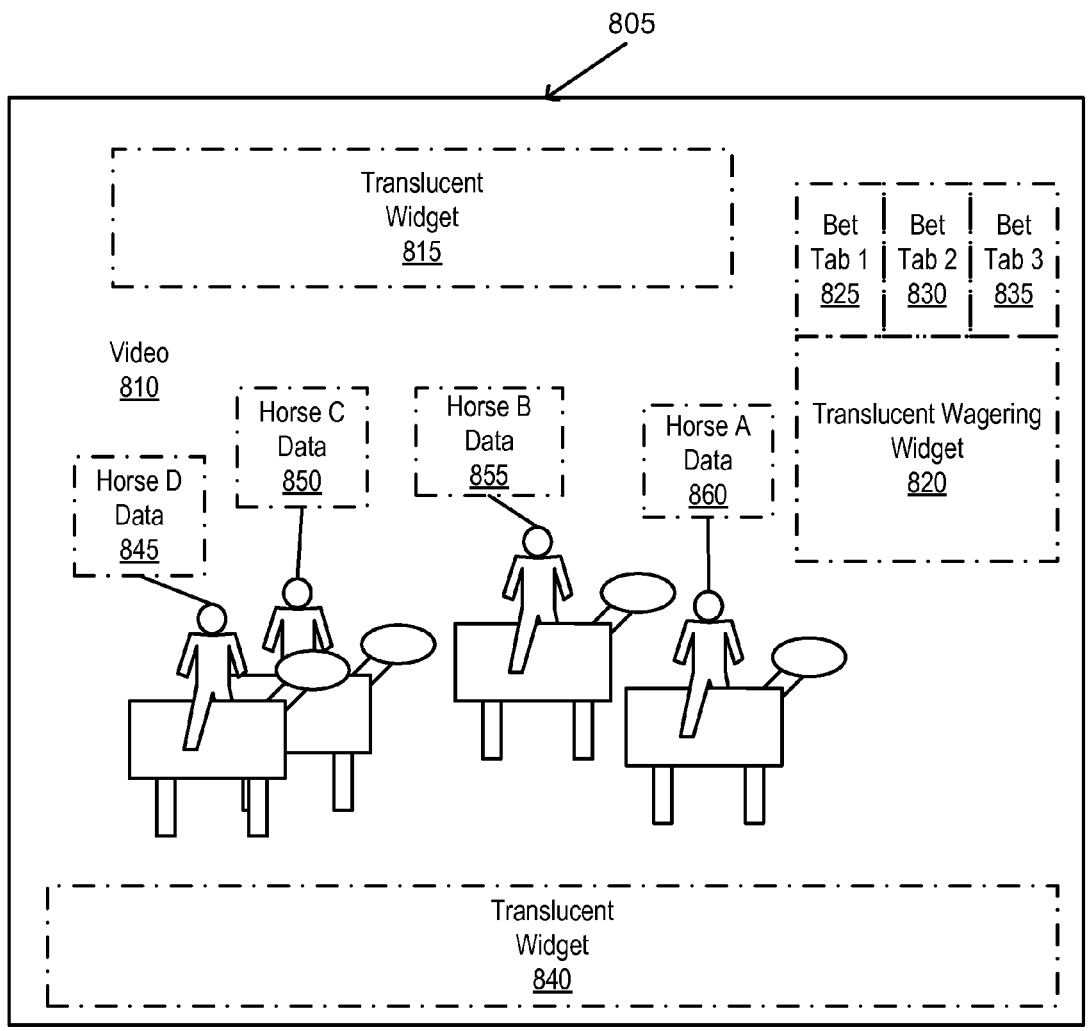
FIG. 8 is an example user interface displaying live media of a horse race integrated with data associated with participants in the horse race according to one embodiment.

FIG. 8 illustrates another example user interface displaying video of a horse race integrated with data associated with participants in the horse race according to one embodiment. In one embodiment, the data associated with the horse race participants is updated in real-time and accessible through the user interface. By selecting a jockey or horse, the end user is presented data relevant to that horse's or jockey's performance at a particular point in the race. Data for a single horse or jockey or a plurality of horses or jockeys can be displayed, allowing a user to compare the performance of different horses or jockeys. Horse or jockey performance data can be displayed in translucent windows above particular horses or jockeys 845, 850, 855, 860 as shown in FIG. 8. In other embodiments, the application 250 displayed the data in another manner which indicates which data is associated with a horse or jockey. Information displayed includes, but is not limited to, current speed, current acceleration, current position, etc., allowing the end user to analyze a horse's or a jockey's performance throughout a race or to compare performances of different horses or jockeys in the same race. The displayed data could come from a variety of sources, such as radio frequency identification (RFID) tags placed on the horses or jockeys or distributed around the race track. In certain embodiments, windows pointing to a particular horse also simplify tracking of a particular horse within a crowd to monitor its progress. Use of these windows also simplifies tracking of a horse during a race if the device used to display the race has a limited display area. Other translucent widgets 815, 820, 840 also may be displayed according to user preferences or user input. The functionalities available through such translucent widgets 815, 820, 840 include, but are not limited to, the functionalities discussed in conjunction with FIG. 6. Thus, the end user is able to view a horse race and data describing performance of one or more participants in the horse race while executing additional activities associated with viewing and wagering on horse racing using a single user interface.

Figure 9:
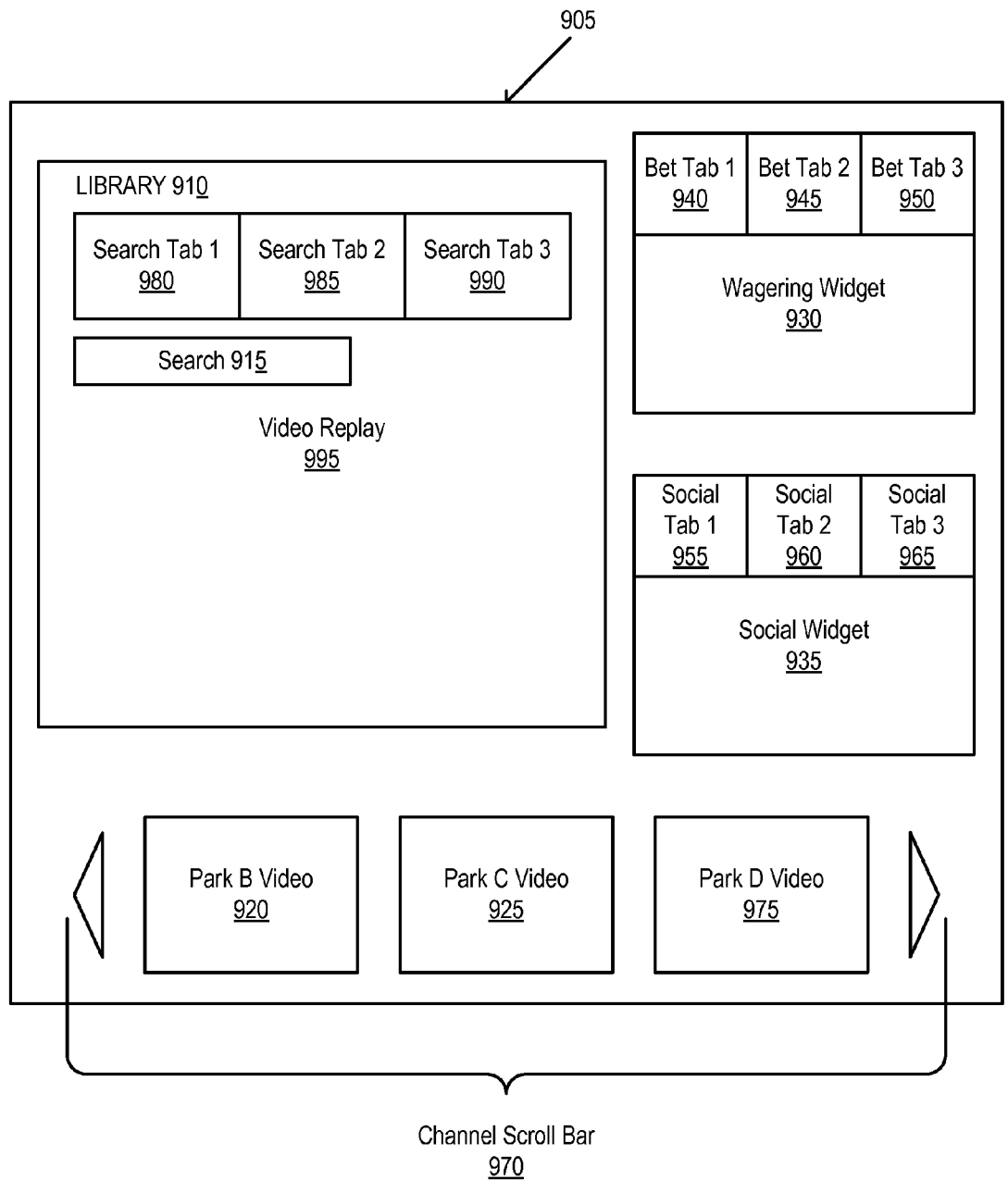
FIG. 9 is an example user interface displaying integrated media of a prior horse race and data associated with the prior horse race according to one embodiment.

In one embodiment, the application 250 also includes research capabilities, allowing the end user to research one or more participants in a horse race. This may be referred to as "Multimedia Handicapping." An example user interface 905 including research capabilities is shown in FIG. 9. For example, previously completed races and data associated with the previously completed races are accessed from the user interface 905. With the same convenience of a user interface 905 wherein video and wagering data are simultaneously viewable, the end user may view video replays 995 of one or more completed races along with data associated with the completed race for research purposes, allowing the end user to make more informed wagers in the future. When Multimedia Handicapping is accessed, replays 995 are presented of stored integrated data streams corresponding to one or more previously held live events. Whereas live multimedia streams are driven by temporal data or clock signals associated with one or more live media streams, replays 995 are driven by stored temporal data or clock signal data associated with the stored multimedia streams. Thus, within Multimedia Handicapping, though the presented media is no longer live, it may still be properly time-synchronized and presented alongside contextually relevant asynchronous data as in the live media embodiments. In one embodiment, replays recreate a live event as would have been experienced at the time of its original presentation, complete with time-synchronized real-time data and contextually linked asynchronous data that was originally presented with the live media content.

In certain embodiments, the user interface includes a library 910 (maintained in the asynchronous data storage 102) of previous races to allow the end user access to multiple previously completed races. The end user can also selectively record certain races or other events of interest based on individual selection or based on an automated selection system and store the recorded data to the library 910. In one embodiment, search tabs 980, 985, 990 are used to browse past races by category, such as date, track, horse, or jockey. In one embodiment, a keyword search region 915 is included to simplify user searching of data in the library 910. The library 910 may be accessed while the end user monitors live racing using one or more widgets 930, 935 and/or a channel scroll bar 970 in the interface. The functionalities available through such widgets would include, but not be limited to, any of these discussed in reference to FIG. 6. The end user can adjust the interface 905 as desired, choosing which widgets are displayed, selecting which data is viewed, and controlling video and audio settings.

In some Multimedia Handicapping embodiments, the interface 905 provides a complete recreation of the user experience at the time a previously held live event was presented. The time-synchronization and contextual relating capabilities utilized in live embodiments may serve to recall the entire history of the event from one or more archives in the asynchronous data storage 102. Media feeds 205, track feeds 210, social data feeds 160, any other relevant data feeds 220 and contextually relevant asynchronous data are displayed according to user preferences. In one embodiment, this is done by identifying all stored data with temporal data corresponding to some previous presentation time, allowing archived data from media feeds 205, track feeds 210, social data feeds 160, any other relevant data feeds 220 previously presented simultaneously to again be presented simultaneously.

Alterations to the application 250 can include, but need not be limited to, the addition of other interactive widgets into the interface, the expansion of the information or functionalities provided by the widgets, or a combination of different embodiments and interface views already presented.

It is noted that in other embodiments the principles disclosed herein may be applied beyond viewing and wagering on horse racing. For example, the disclosed embodiments could enable a user to participate in any live broadcasted event (such as a game show or a concert) in real-time over the Internet either alone or with others by generating and distributing an interactive multimedia event. Such participation could take place using any interactive medium, such as a client device 185, a mobile device, or a television. The disclosed embodiments could also enable multiple users to communicate, make transactions, or play games with each other while viewing a live concert, sporting, or entertainment event. Further, the disclosed embodiments could enable gamblers to wager on any live sporting event while watching the event, with wagering and viewing capabilities provided by a single interface. The disclosed embodiments could also be adapted for fantasy football or baseball leagues or the like in which end users can interact with each other and media content related to the sport of interest while executing relevant monetary transactions. Hence, the disclosed embodiments beneficially enhance the end user's ability to enjoy integrated media content in a convenient, interactive, and integrated manner.

Additional Considerations

The features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

In addition, some portions of the detailed description that follows are presented in terms of algorithms and symbolic representations of operations on data bits within a computer memory. These algorithmic descriptions and representations (for example, as illustrated and described through FIGS. 1-5) are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative systems and methods for providing a high-quality remote wagering environment in which users may simultaneously view and wager on horse racing using time synchronized media and data along with contextually relevant data within a single display in accordance with the disclosed principles herein. Thus, while particular embodiments and applications have been illustrated and described, it is to be understood that the embodiments are not limited to the precise construction and components disclosed herein and that various modifications, changes and variations which will be apparent to those skilled in the art may be made in the arrangement, operation and details of the method and apparatus disclosed herein without departing from the spirit and scope of the disclosure and appended claims.

What is claimed is:

1. A computer system for transmitting data for presentation to an end user, the system comprising:
    a non-transitory computer-readable storage medium storing executable computer program instructions that when executed by one or more processors cause the processors to:
        receive media data and associated non-media data for a plurality of events;

receive a request for media data from two or more of the plurality of events from the end user;

identify activities of other users associated with the end user in a social network, the activities of the other users associated with the two or more of the plurality of events;

determine temporal data for each of the requested media data and associated non-media data from the two or more of the plurality of events and the identified activities based on a synchronization clock reference;

combine the requested media data and the associated non-media data from the two or more of the plurality of events and the identified activities based on a correspondence of the determined temporal data to generate an integrated data feed;

determine a context for the integrated data feed based on the requested media data and the non-media data associated with the requested media data;

responsive to the determined context, identify asynchronous data stored by an asynchronous data storage as contextually relevant to the integrated data feed; and output the integrated data feed including the media data and the associated non-media data from the two or more of the plurality of the events and the identified activities for simultaneous presentation to the end user and the contextually relevant asynchronous data in association with the integrated data feed for presentation to the end user.

2. The computer system of claim 1, wherein:

determining temporal data comprises identifying temporal data associated with portions of the associated non-media data, the portions of the non-media data comprising real-time data received from feeds associated with the events; and wherein generating the integrated data feed comprises combining the requested media data with the portions of associated real-time data.

3. The computer system of claim 2, wherein:

the plurality of events are horse racing events and the received media data for an event comprises one or more videos of a horse race;

the associated real-time data for the event comprises wagering data associated with the horse race; and the contextually relevant asynchronous data comprises past performance data for participants in the horse race.

4. The computer system of claim 1, further comprising instructions that when executed cause the processors to:

map the integrated data feed to the identified contextually relevant asynchronous data, wherein mapping comprises manipulating metadata that associates the contextually relevant asynchronous data with the integrated data feed to create a data combination;

transmit the data combination to the client device; and store the data combination for subsequent presentation to end users.

5. The computer system of claim 4, further comprising instructions that when executed cause the processors to:

enhance the data combination by analyzing the data combination and, responsive to the analysis, create at least one of data or a data field to further capture contextual relationships within the data combination.

6. The computer system of claim 1, wherein a wager from a player pool receiving money from the end user and at least one of the other end users associated with the end user in the social network is placed in a pari-mutuel pool identified in the non-media data for the two or more of the plurality of events on behalf of the end user and the at least one of the other end users having placed money in the player pool.

7. A computer system for transmitting data for presentation to an end user, the system comprising:

a content delivery network adapted to distribute media data received from one or more media streams from each of a plurality of events;

a server adapted to distribute associated real-time data received from one or more real-time data feeds from each of the plurality of events; and a non-transitory computer-readable storage medium comprising one or more modules including executable computer program instructions that when executed by one or more processors cause the processors to perform one or more steps, the modules comprising:

a time synchronization module adapted to communicate with a plurality of clients, the content delivery network and the server to:

receive, from a client device associated with the end user, a request for a portion of the media data received for two or more of the plurality of events, identify activities of other users associated with the end user in a social network, the activities of the other users associated with the portion of media data requested by the client device;

determine temporal data for each of the requested portion of media data, real-time data associated with the requested media data, and the identified activities based on a synchronization clock reference;

generate an integrated data feed by combining the requested media data, the real-time data associated with the requested media data, and the identified activities based on a correspondence of the determined temporal data, determine a context for the integrated data feed based on the requested media data and the real-time data associated with the requested media data, and output the integrated data feed including the requested portion of media data, real-time data associated with the requested media data, and the identified activities for simultaneous presentation to the end user on the client device and the contextually relevant asynchronous data in association with the integrated data feed.

8. The computer system of claim 7, further comprising receiving, from the client device, a request for a portion of the associated real-time data, and wherein:

determining temporal data comprises identifying temporal data associated with the requested associated real-time data; and generating the integrated data feed comprises combining the requested media data with the requested associated real-time data having corresponding time reference signals.

9. The computer system of claim 7, further comprising:

a contextual relating module adapted to communicate with the time synchronization module and an asynchronous data storage, to identify asynchronous data stored by the asynchronous data storage as contextually relevant to the integrated data feed, and to output the contextually relevant asynchronous data.

10. The computer system of claim 9, wherein identifying asynchronous data stored by the asynchronous data storage as contextually relevant to the integrated data feed further comprises:

determining a context for the integrated data feed based on at least one data ontology included in the asynchronous data storage responsive to the requested media data and the real-time data associated with the requested media data, and identifying asynchronous data having the determined context.

11. The computer system of claim 9, the contextual relating module further adapted to:
store data included in the integrated data feed in association with the contextually relevant asynchronous data in the asynchronous data storage;
determine at least one ontology for the asynchronous data stored in the asynchronous data storage; and
organize the asynchronous data stored in the asynchronous data storage based on the at least one determined ontology.

12. A computer program product, the computer program product stored on a non-transitory computer-readable storage medium and including program code for causing a processor to execute the steps of a process for transmitting data for presentation to an end user, the process comprising:
receiving media data and associated non-media data for a plurality of events;
receiving a request for media data from two or more of the plurality of events from the end user;
identifying activities of other users associated with the end user in a social network, the activities of the other users associated with the two or more of the plurality of events;
determining temporal data for each of the requested media data and associated non-media data from the two or more of the plurality of events and the identified activities based on a synchronization clock reference;
combining the requested media data and the associated non-media data from the two or more of the plurality of events and the identified activities based on a correspondence of the determined temporal data to generate an integrated data feed;
determining a context for the integrated data feed based on the requested media data and the non-media data associated with the requested media data;
responsive to the determined context, identifying asynchronous data stored by an asynchronous data storage as contextually relevant to the integrated data feed; and
outputting the integrated data feed including the media data and the associated non-media data from the two or more of the plurality of the events and the identified activities for simultaneous presentation to the end user and the contextually relevant asynchronous data in association with the integrated data feed for presentation to the end user.

13. The computer program product of claim 12, wherein:
determining temporal data comprises identifying temporal data associated with portions of the associated non-media data, the portions of the non-media data comprising real-time data received from feeds associated with the events;
wherein generating the integrated data feed comprises combining the requested media data with the portions of associated real-time data.

14. The computer program product of claim 13, the process further comprising:
storing data included in the integrated data feed in association with the contextually relevant asynchronous data in the asynchronous data storage;
determining at least one ontology for the asynchronous data stored in the asynchronous data storage; and
organizing the asynchronous data stored in the asynchronous data storage based on the at least one determined ontology.

15. The computer program product of claim 12, wherein the contextually relevant asynchronous data is identified based on at least one data ontology included in the asynchronous data storage.

16. A computer-implemented method for presenting data to an end user, the method comprising:
receiving media data and associated non-media data for a plurality of events;
receiving a request for media data from two or more of the plurality of events from the end user;
identifying activities of other users associated with the end user in a social network and a player pool for the end user, the activities of the other users associated with at least one of the plurality of events, and the player pool receiving money from the end user and at least one of the other end users associated with the end user in the social network for placing a wager on at least one of the plurality of events;
determining temporal data for each of the requested media data and associated non-media data from the two or more of the plurality of events and the identified activities based on a synchronization clock reference;
combining the requested media data and the associated non-media data from the two or more of the plurality of events and the identified activities based on a correspondence of the determined temporal data to generate an integrated data feed;
determining a context for the integrated data feed based on the requested media data and the non-media data associated with the requested media data;
responsive to the determined context, identifying asynchronous data stored by an asynchronous data storage as contextually relevant to the integrated data feed; and
outputting the integrated data feed including the media data and the associated non-media data from the two or more of the plurality of the events and the identified activities for simultaneous presentation to the end user and the contextually relevant asynchronous data in association with integrated data feed for presentation to the end user.

17. The method of claim 16, wherein:
determining temporal data comprises identifying temporal data associated with the requested media data and a portion of the associated non-media data, the portions of the non-media data comprising real-time data received from feed associated with the events; and
wherein generating the integrated data feed comprises combining the requested media data with the portion of associated real-time data.

18. The method of claim 17, the method further comprising:
storing data included in the integrated data feed in association with the contextually relevant asynchronous data in the asynchronous data storage;
determining at least one ontology for the asynchronous data stored in the asynchronous data storage; and
organizing the asynchronous data stored in the asynchronous data storage based on the at least one determined ontology.

19. The method of claim 17, further comprising:
executing on the client device an application for presenting to the end user the data included in the integrated data feed along with the contextually relevant asynchronous data.

20. The method of claim 19, wherein presenting to the end user the data included in the integrated data feed along with the contextually relevant asynchronous data comprises presenting a user interface, the user interface comprising:
  a viewing pane for:
    receiving input from the end user;
    initiating a request based on the input for the data received in the integrated data feed; and
    presenting the data included in the integrated data feed, wherein the integrated data feed includes the requested media data and the associated non-media data, the media data for an event comprising one or more videos of a horse race; and
  a wagering widget for:
    presenting wagering information related to the horse race, the wagering information identifying the wagers to be placed with the money in the player pool;
    receiving input from the end user; and
    receiving funds in the player pool from the end user for placing the wager on the horse race based on the received input.

21. The method of claim 20, the user interface further comprising a social widget for communicating with the other users in the social network of the user.

22. The method of claim 20, further comprising presenting real-time data related to a participant of the horse race in the integrated data feed within the viewing pane in response to a user selection of the participant.

23. The method of claim 19, the method further comprising:
  searching the asynchronous data storage for previously stored media data or asynchronous data responsive to a search query received from the end user; and
  presenting to the end user the previously stored media data along with contextually relevant asynchronous data that was originally presented with the stored media data.

24. The method of claim 16, wherein the contextually relevant asynchronous data is identified based on at least one data ontology included in the asynchronous data storage.

25. A computer program product, the computer program product stored on a non-transitory computer-readable storage medium and including program code for causing a processor to execute the steps of a process for presenting data to an end user, the process comprising:
  initiating a request specifying data to receive in an integrated data feed for a plurality of events, the integrated data feed comprising synchronized media data and associated real-time data including social interaction data and wagering data for the plurality of events, the media data and the associated real-time data synchronized to form the integrated data feed by combining the media data and the associated real-time data based on a correspondence of temporal data determined from a synchronization clock reference;
  initiating a request specifying data to receive from asynchronous data, wherein the asynchronous data is identified as contextually relevant to the integrated data feed responsive to a context of the integrated data feed, wherein the context is determined based on the requested media data and associated real-time data;
  receiving the integrated data feed including the media data and the associated real-time data for the plurality of the events for simultaneous presentation to the end user;
  receiving the contextually relevant asynchronous data; and
  presenting a user interface to the end user that includes information from the integrated data feed and information from the contextually asynchronous data, the user interface comprising:
    a viewing pane generated for:
      receiving input from the end user;
      initiating the request for asynchronous data and the request for the integrated data feed; and
      presenting the media data from the plurality of the events simultaneously with the real-time data received in the integrated data feed to the end user, the integrated data feed for the plurality of events corresponding a plurality of horse races;
    a wagering widget generated for:
      presenting wagering data related to a horse race in the plurality of horse races, the wagering data included in the associated real-time data;
      receiving input from the end user; and
      placing a wager on the horse race based on the received input; and
    a social widget for interacting with other users associated with the user in a social network and presenting social interaction data, wherein the social interaction data is received in the associated real-time data.

26. The computer program product of claim 25, the user interface further adapted to present real-time data related to a participant of the horse race within the viewing pane in response to a user selection of the participant.

27. The computer program product of claim 25, the process further comprising presenting an input field for initiating a request to search an asynchronous data storage for previously stored media data responsive to a search query, wherein the previously stored media data is received along with asynchronous data that was originally presented with the stored media data.

28. The computer program product of claim 25, the integrated data feed further comprising information for a player pool identified for the end user, the player pool receiving money from the end user and at least one other end users associated with the end user in a social network for placing a wager on at least one of the plurality of events, the user interface further presenting wagering activities of other users associated with the end user in a social network, the wagering activities of the other users associated with at least one of the plurality of events.

* * * * *